(12) United States Patent
Albert

(10) Patent No.: US 7,126,240 B2
(45) Date of Patent: Oct. 24, 2006

(54) SECURE METHOD FOR MANAGING THE OPERATING CONDITIONS OF A APPARATUS BY A USER AND EQUIPMENT THEREFOR

(75) Inventor: Pascal Albert, Bertrange (LU)

(73) Assignee: Sevic System AG, Neuwied (DE)

( * ) Notice: Subject to any disclaimer, the term of this patent is extended or adjusted under 35 U.S.C. 154(b) by 413 days.

(21) Appl. No.: 10/312,737

(22) PCT Filed: Jun. 29, 2001

(86) PCT No.: PCT/FR01/02104

§ 371 (c)(1),
(2), (4) Date: Jul. 25, 2003

(87) PCT Pub. No.: WO02/01027

PCT Pub. Date: Jan. 3, 2002

(65) Prior Publication Data
US 2004/0012261 A1 Jan. 22, 2004

(30) Foreign Application Priority Data
Jun. 30, 2000 (FR) .................................. 00 08643

(51) Int. Cl.
H01H 27/00 (2006.01)

(52) U.S. Cl. .................. 307/10.3; 307/10.6; 340/5.61; 180/287

(58) Field of Classification Search ............... 307/10.5, 307/10.3, 10.6; 340/5.31, 426.17, 5.61; 180/287
See application file for complete search history.

(56) References Cited

U.S. PATENT DOCUMENTS

| | | | |
|---|---|---|---|
| 5,219,413 A * | 6/1993 | Lineberger | 180/272 |
| 5,546,754 A * | 8/1996 | Terao et al. | 62/133 |
| 5,736,935 A | 4/1998 | Lambropoulos | |
| 5,869,908 A | 2/1999 | Moczygemba et al. | |
| 6,024,382 A | 2/2000 | Baumann | |
| 6,400,255 B1 * | 6/2002 | Ohnishi et al. | 307/10.3 |
| 6,812,829 B1 * | 11/2004 | Flick | 340/426.13 |

FOREIGN PATENT DOCUMENTS

WO  WO 00 13947  3/2000

* cited by examiner

*Primary Examiner*—Robert L. Deberadinis
*Assistant Examiner*—Andrew M. Deschere
(74) *Attorney, Agent, or Firm*—Young & Thompson

(57) ABSTRACT

A method for enabling an apparatus (15) to operate only after detecting with receiver elements (11) located proximate to the apparatus, a signal transmitted by portable transmitted elements (1), which consists in no longer taking into account detection by the receiver means (11) of the signal transmitted by the transmitting elements (1), after activating presence sensing elements (22) provided proximate to the apparatus, or integrated in the apparatus. Once activated, the presence sensing elements (22) neutralize the transmitter/receiver device (1, 11) and the apparatus can operate normally without being perturbed by possible statics or accidental losses of signal. The inventive method and device are applicable to an antitheft safety device for a motor vehicle.

15 Claims, 2 Drawing Sheets

SECURE METHOD FOR MANAGING THE OPERATING CONDITIONS OF A APPARATUS BY A USER AND EQUIPMENT THEREFOR

BACKGROUND OF THE INVENTION

This invention concerns a secured method for managing the operation of an apparatus by a user, which method is of the type enabling the operation of the apparatus only after detection by receiving means situated close to the apparatus, of a signal transmitted by portable transmitting means; the invention also concerns the hardware for the implementation of the method.

One already knows safety systems adapted on an apparatus which, to authorize the operation of this apparatus, involve the existence of a link between a transmitter carried by the user and a receiver provided close to said apparatus or on said apparatus.

For example, the document EP-0 319 428 describes an anti-theft safety device for vehicle comprising a portable transmitter which transmits a high frequency signal (HF), and a fixed receiver adapted for cutting off automatically the ignition circuit of the engine of the vehicle assembly, when the distance between the portable transmitter and the on-board received exceeds a certain value. Such a system stops the motor of the vehicle, in particular in case of theft, as soon as the vehicle moves away from the carrier of the transmitter.

The transmitter transmits a low power, encoded cyclic HF signal. When this signal is acknowledged and validated by the reception means, a relay or equivalent closes the ignition circuit of the engine to ensure its operation. When the reception system does not receive the HF signal transmitted any longer, the relay or equivalent cuts off the ignition circuit in order to stop the motor.

A time-delay circuit is provided to maintain the control of the relay for a duration greater than that intermediate two encoded sequences, in order to avoid any false interruption in case of interferences, or more generally in case of accidental loss of the signal.

However, if the duration of accidental loss of this signal is greater than the time-delay duration, the ignition circuit is automatically cut off by means of the relay and the motor of the vehicle does not operate any longer. This may cause sizeable malfunctions, and may even prove dangerous.

The object of this invention is to remedy this shortcoming.

SUMMARY OF THE INVENTION

Within the framework of a method consisting in enabling the operation of an apparatus only after detection by receiving means situated close to said apparatus, of a signal transmitted by portable transmitting means, this invention allows not to take into account any longer the detection by the receiving means of the signal transmitted by the transmitting means, after activation of presence detection means arranged close to said apparatus, or integrated to said apparatus.

The method according to this invention consists in fact in activating a switching system interposed on the control circuit of the apparatus, in order to close such circuit after detection of the signal transmitted by the transmitting means, and to lock this closure by activating presence detection means arranged close to said apparatus, or integrated to said apparatus.

According to a preferred embodiment, the method according to this invention consists, once the apparatus in operation, in triggering by each activation of the presence detection means, a second safety detection of the signal transmitted by the transmitting means, for a preset time period and, once said time period has expired, in locking, either the closure of the control circuit of said apparatus in case of a validation of signal, or the opening of said circuit in case of non-validation of this signal, while not taking into account any longer, after locking said closure or opening of the circuit, the transmitter/receiver link. One then takes into account again the basic transmitter/receiver link, after a change of state (deactivation) of the presence detection means.

In case of absence of problem associated with a theft or with an aggression, the presence detection means neutralise the transmitter/receiver device and the apparatus may operate normally, without being disturbed by possible interferences or accidental loss of signal.

The hardware for the implementation of this method comprises:
  portable transmitting means,
  a receiver module situated close to the apparatus whereof one wishes to manage the operation,
  a switching system (such as relay, transistor, switch or equivalent) interposed on the control circuit of the apparatus,
  presence detection means arranged close to said apparatus or integrated to said apparatus, and
  control means (for example in the form of a microprocessor) which are laid out to close the control circuit of the apparatus by means of the switching system when the signal transmitted by the transmitting means is detected by the receiving means, and acknowledged, and which are laid out to lock the closure of this control circuit when the presence detection means are activated.

The transmitting means have preferably limited power, in order to authorize the reception of the signal by the receiver module, only within a radius of several meters.

Still according to the invention, the switching system is in the form of a power output interposed on the control circuit of the apparatus to cut off or restore such circuit in relation to the signal or of the absence of signal supplied by control means in the form of a microprocessor, which microprocessor manages the sending of this signal in relation to the information received by the receiving means.

According to another preferential characteristic, the control means of the safety hardware are laid out in order to, once the apparatus in operation, trigger by each activation of the presence detection means, a second safety detection of the signal transmitted by the portable transmitting means, for a pre-set time period (for example 15 seconds); once this time period has expired, said control means lock, either the closure of the control circuit of the apparatus in case of a validation of said signal, or the opening of said circuit in case of non-validation of said signal, this without taking into account any longer said locked closure or opening, of the transmitter/receiver link. The control means of the safety hardware take again into account the transmitter/receiver link, after a change of state (deactivation) of the presence detection means.

In an embodiment applied to an anti-theft safety device for an engine vehicle, the hardware according to this invention comprises portable transmitting means, a receiver module on board the vehicle, presence detection means integrated to said vehicle and control means of a switching system placed on at least a circuit necessary to the correct operation of said vehicle, for example the ignition circuit of the motorisation, the starter circuit, or the fuel incoming circuit. These control means are laid out to close said circuit by means of said switching system when the signal transmitted by the transmitting means is detected by the receiver module, and acknowledged; they are also laid out to manage the locking of the closure or of the opening of said circuit in relation to the second identification control triggered by the presence detection means.

In this particular application, the presence detection means may be in the form of a sensor implanted in or on the seat of the vehicle and adapted to be activated when the user of the vehicle sits down on said seat. According to embodiment variations, such presence detection means may be in the form of a system for detecting when a gear has been selected, or in the form of system for detecting a given threshold of an engine duty.

Within the framework of an application to an automotive vehicle or to a truck, such presence detection means may be in the form of a closure/opening sensor for the driver's door, in the form of a system for detecting when the seatbelt has been fastened, in the form of an infrared sensor positioned in the body of the vehicle, or other suitable means.

According to another characteristic, adapted means enable detection of the presence or the absence of a voltage at the ON/OFF contact of a starter for the vehicle motor, the corresponding information being transmitted by control means in order to activate the receiver module only in case of presence of said starter contact.

According to another particularity, within the framework of an application to an automotive vehicle or to a truck, a presence sensor may be laid out close to the driver's door, the activation information of said presence sensor being transmitted to the control means of the safety device, in order to activate the receiver module.

BRIEF DESCRIPTION OF THE DRAWINGS

But the invention will be better illustrated, without being limited thereto, by the following description of a particular embodiment, given only for exemplification purposes and represented on the appended drawings wherein.

DESCRIPTION OF THE PREFERRED EMBODIMENTS

Figure 1:
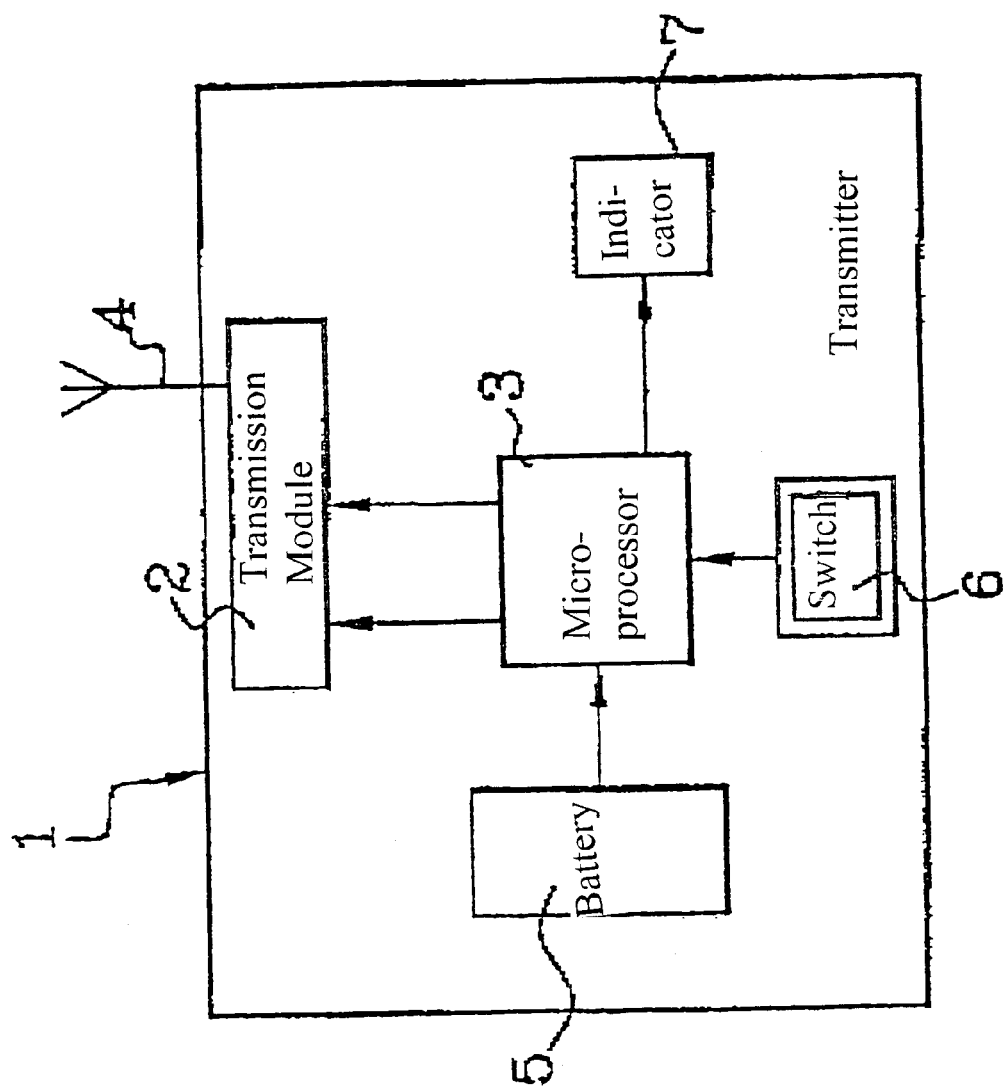
FIG. 1 is a principle diagram of the portable transmitting means of an antitheft safety device for an engine vehicle, according to this invention.

The transmitting means 1 represented on FIG. 1 comprise a transmission module 2, for example high frequency (HF), whereof the operation is managed by a microprocessor 3 to send to an antenna 4 a cyclic and low power encoded signal.

The transmission module 2 may be a model LQ-TX 433A-S of LPRS-OXON-Great-Britain. The microprocessor 3 with integrated clock may be a model 2343 with EDPROM, of Société ATMEL (Paris, France).

The different components of the transmitting means 1 are implanted on a printed circuit and connected together logically. A battery 5 provides their electrical supply and the assembly is placed in a portable box which may be fitted with a system for hanging on a pocket or a belt. Putting into or off operation of the transmitting means 1 is control by an on/off switch 6 laid out on the portable box. This box comprises moreover a LED-type light-indicator 7 whereof the activation is managed by the microprocessor 3.

The signal transmitted by the transmitting means 1 carries an encoding generated by the microprocessor 3 to secure the operation of the device. On the other hand, the signal is transmitted cyclically to spare the battery 5; for example the transmission is realised on the 868.35 MHz frequency, and this for one second every 2.5 or 3 second (the transmission duration and the period are managed by the microprocessor 3).

One also intends to limit the power of the signal transmitted (a few milliwatts) in order to enable the reception of this signal only within a radius of several meters.

Figure 2:
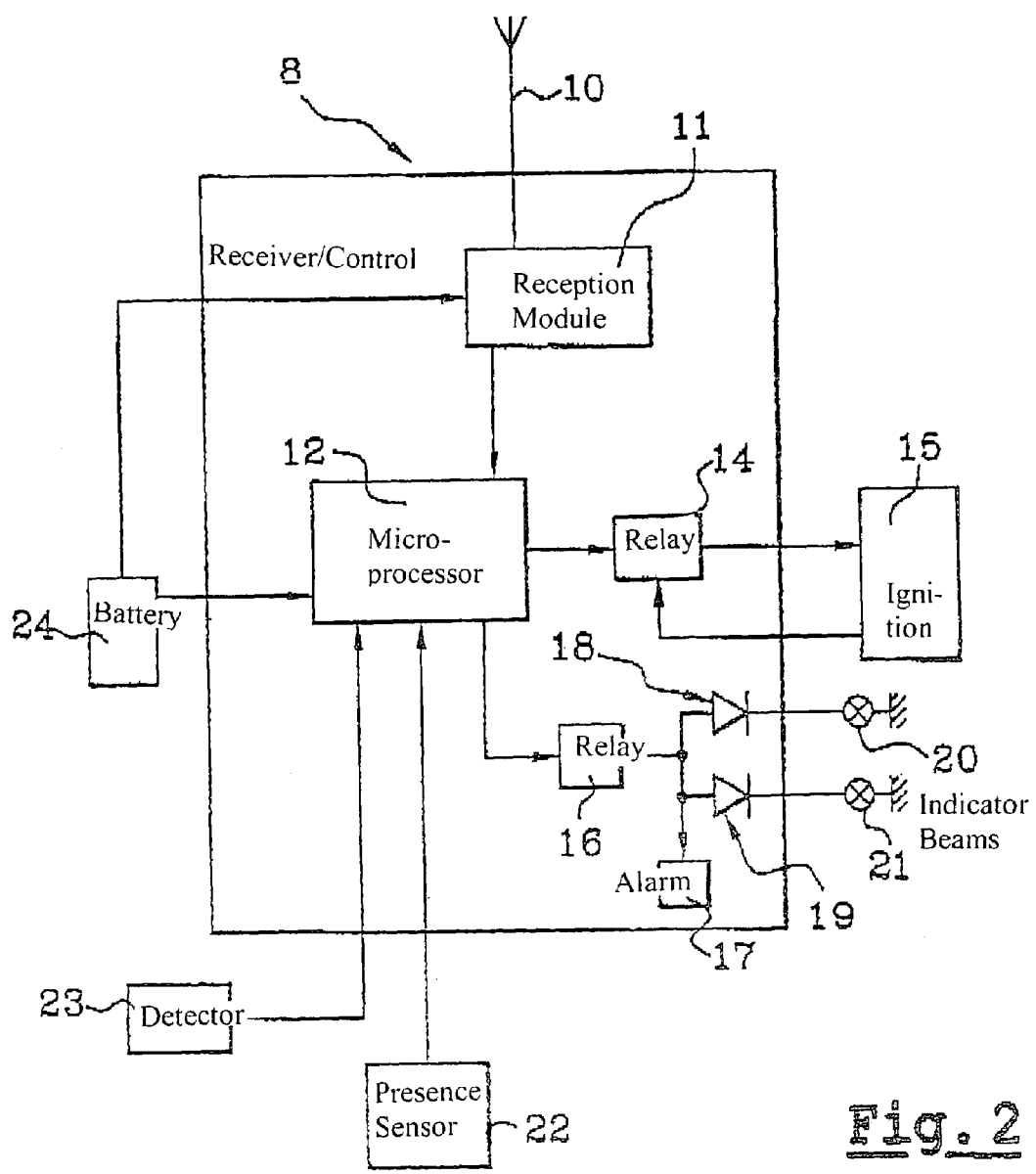
FIG. 2 represents the principle diagram of reception and control means on board the vehicle.

The reception and control means 8 represented on FIG. 2 are on board the vehicle assembly (for example a motorbike). They are composed of an antenna 10 connected to a reception module 11 associated with a microprocessor 12. The purpose of such microprocessor 12 is to check by encoding identification that the signal received is indeed the one originated from the transmitting means 1 and, in relation to the information received, in order to manage the activation:

of a power output 14 (relay or equivalent) placed on the ignition circuit 15 of the motorisation of the vehicle, and of a power output 16 (relay or equivalent) which controls, simultaneously, a sound alarm 17 in the form of a buzzer and a redundant output with non-return diodes 18, 19 to supply the right 20 and left 21 indicator beams.

To manage the operation of the safety device, the microprocessor 12 also takes into account:

the activation or the deactivation of a presence sensor 22 laid out on the driver's seat of the vehicle. This sensor 22 may be of FSR type distributed by ALCYON-Paris, France, and the presence or the absence of a starter contact of the vehicle. The corresponding information is transmitted to the microprocessor by appropriate detection means 23 (for example from a voltage detected on the on/off contact of the starter).

The reception module 11 may be a model RX 5000 manufactured by RFM (USA) and distributed by EQUIPEMENT SCIENTIFIQUE-Garche, France. The microprocessor 12 is for example a model PIC 16C with integrated converter of MICROTCHIP (USA) and distributed by AROW-Rennes, France. The different electronic components of the reception and control means 8 are implanted on a printed circuit and connected together logically. The reception module 11 and the microprocessor 12 are supplied by the battery 24 of the vehicle.

Once the reception and control means 8 have been implanted correctly on the vehicle assembly, the anti-theft safety device operates as described below.

The transmitting means 1 and the receiver module 11 being deactivated, the microprocessor 12 controls the power output 14 in order to open the ignition circuit 15 of the vehicle, thereby preventing the operation of the motor.

Putting into service the transmitting means 1 is made by bringing the switch 6 into the ON position; the light-indicator 7 may signal such activation for example by a steady so-called long light, greater than 1 second. On the other hand, putting into service the receiver module 11 is made by the starter contact of the vehicle, by means of the key placed in 12 Volt position after contact. The receiver module is, in fact, actuated by the microprocessor 12 on the basis of a piece of information supplied by the detection means 23.

As soon as the starter contact has been established, the receiver module 11 detects the HF signal transmitted by the transmitting means 1 and it sends the information to the microprocessor 12. After identification of the signal, the microprocessor 12 closes the ignition circuit 15 by means of the power output 14; simultaneously it may initiate the transmission of an identification message while activating the blinkers 20, 21 and the buzzer 17 by means of the power output 16 (for example transmission of three short flashing signals according by three sound beeps.

The vehicle may then be started.

When the user sits down on the seat of the vehicle, the presence sensor 22 is activated and the microprocessor 12 then requests an additional safety validation of the signal transmitted by the transmitting means 1, for a pre-set safety time period, which may be of the order of 15 seconds.

In the general case when the receiving means 11 detect and acknowledge the signal transmitted by the transmitting means 1 for the whole duration of the safety time-period aforementioned, with the expiration of this time period, the microprocessor 12 locks the closure of the ignition circuit 15 by means of the power output 14 without taking into account any longer the basic HF signal from the transmitting/receiving means.

The vehicle may be used conventionally, without this use being disturbed by possible accidental losses of the HF signal.

In the other case when the receiving, means 11 do not detect or do not recognise the HF signal transmitted by the portable transmitting means 1 for the whole duration of the safety time-period, the microprocessor 12 opens the ignition circuit 15 by means of the power output 14 and locks the opening of this circuit without taking into account any longer the HF signal of the transmitting/receiving means.

In either case mentioned aforementioned, the microprocessor 12 will again take into account the HF link of the transmitting/receiving means at the time of deactivation of the presence sensor 22; and the procedure detailed above will be repeated after new activation of said sensor 22. Each activation of the presence sensor 22 involves a new identification request of the HF signal between the transmitting means and the receiving means. And each deactivation of said sensor causes the <<permanent>> HF link of the transmitting/receiving means to be taken into account again; taking into account the <<permanent>> HF link again may be performed after a time-delay which is greater than the cyclic transmission period of the HF signal.

Further to a conventional usage of the vehicle, when the user kills the starter contact, the receiver module 11 is not activated any longer and the microprocessor 12 cuts off automatically the starter circuit 15 by means of the power output 14 to put the anti-starting system into service.

Putting the anti-starting system into service may be accompanied by a control signal of the light-indicator 7 (for example a short steady light of the order of a few tenths of a second); also, such activation of the anti-starting system may be signalled by the flashing lights 20, 21 and the buzzer 17 (for example transmission of a short luminous signal accompanied by a sound beep) . The switch 6 of the transmitting means 1 may be placed in the off position since the receiver module 11 cannot receive the HF signal transmitted any longer.

According to the management mode which has just been described, when the vehicle is en operation, if the user walks away after leaving the seat, without cutting off the motorisation, as soon as the receiver module 11 does not receive the HF signal transmitted by the transmitting means 1 any longer, the microprocessor 12 activates the power output 14 to cut off the ignition circuit 15. The vehicle cannot then start until the carrier of the transmitting means 1 activates the starter contact.

In case of theft or intrusion, with the engine on, the presence sensor 22 is deactivated when the standard user leaves his seat, then it is re-activated when the intruder takes possession of the vehicle.

If the receiver module 11 does not receive the HF signal transmitted by the transmitting means 1 any longer by the end of the safety time-period (which can be denominated identification range triggered by the intruder sitting down, the microprocessor 12 activates the power output 14 to cut off the ignition circuit 15 in order to stop the vehicle upon completion of identification range, the intruder may drive away with the vehicle, but the starter circuit 15 will open during the next change of state of the sensor to render the vehicle unusable.

As a variation, the power output 14 may be placed on the starter circuit of the vehicle; still according to another variation, this power output 14 may control an electromechanical system placed on the fuel incoming circuit.

More generally, the switching system 14 managed by the microprocessor 12 may control any member necessary to the correct operation of the vehicle.

It should also be noted that in addition to the control of the power outputs 14 and 16, the microprocessor 12 may also manage one or several additional power output(s) entrusted with activating or deactivating other functions of the vehicle. Thus, several members necessary to the correct operation of the vehicle may be managed simultaneously (ignition circuit, starter function, or fuel incoming circuit.

It should further be noted that the seat sensor 22 described in relation with the embodiment above, may be replaced with a system for detecting when a gear has been selected, by a system for detecting when a threshold of a given engine duty has been exceeded (for example 2000 rpm.), or other suitable means, while adhering to the same general operation principle.

The latter case evoked (system for detecting when a threshold of a given engine duty has been exceeded), may in particular be quite suitable to an application of the anti-theft safety device to a vehicle such as a scooter.

Within the framework of an application of an anti-theft safety device similar to an automotive vehicle (conventional car or truck, notably), the presence detection means may be composed of a closure/opening sensor of the driver's door, of a safety belt fastening sensor, of an infrared sensor placed in the body of the car, or other suitable means.

On the other hand, putting into service the receiver module may in such a case be performed by an infrared sensor placed close to the driver's door, for example on the rear-mirror or the handle.

The principle according to this invention for neutralising the transmitting/receiving means by presence detection means enables to make the overall operation of the anti-theft device secure and reliable.

The same principle may be used in very different fields for example for accessing premises, for controlling access to a microcomputer (the presence sensor corresponding here to a piece of information regarding the use of key on a keyboard, of a game joystick, of the mouse or other suitable means.

The invention claimed is:

1. An anti-theft method for an engine-driven vehicle that manages operation of an apparatus of the vehicle, the method comprising the steps of:
    rendering operation of the apparatus possible after detection by a receiver situated close to the apparatus of a cyclic signal transmitted by portable transmitter;
    managing the operation of the apparatus with a controller, the controller being connected to a control circuit of the apparatus by means of a switching system after detection by the receiver of the cyclic signal;
    activating a presence detector situated close to or integrated with the apparatus; and
    activating the switching system to close the control circuit after detection of the cyclic signal,
    wherein activation of the presence detector locks the closure of the control circuit in order to not take into account any longer the cyclic signal to enable operation of the apparatus even when the cyclic signal is no longer received by the receiver.

2. The method according to claim 1, further comprising, once the apparatus is in operation, a validation step of triggering by each further activation of the presence detector a further detection of the cyclic signal for a pre-set time period, and once the pre-set time period has expired, locking the closure of the control circuit when the cyclic signal has been validated and opening of the control circuit when the cyclic signal has not been validated.

3. The method according to claim 2, further comprising, after deactivation of the presence detector, a further validation step of triggering a further detection of the cyclic signal for a preset time period, and once the preset time period has expired, locking the closure of the control circuit when the cyclic signal has been validated and opening of the control circuit when the cyclic signal has not been validated.

4. An anti-theft device for an engine-driven vehicle that manages operation of an apparatus of the vehicle, the device comprising:
    a portable transmitter that transmits a cyclic signal;
    a receiver that receives the cyclic signal and is situated close to the apparatus of the vehicle;
    a presence detector that is close to or integrated with the apparatus; and
    a controller that is connected to a control circuit of the apparatus by a switching system after detection by the receiver of the cyclic signal,
    wherein the device is arranged to activate the switching system to close the control circuit after detection of the cyclic signal, and
    wherein the device is arranged so that activation of the presence detector locks the closure of the control circuit in order to not take into account any longer the cyclic signal to enable operation of the apparatus even when the cyclic signal is no longer received by the receiver.

5. The device according to claim 4, wherein said controller is a microprocessor that cuts and restores power to the control circuit in response to the cyclic signal.

6. The device according to claim 4, wherein said controller is arranged to trigger, once the apparatus in operation, by each activation of said presence detector, a further detection of the cyclic signal for a pre-set time period, and once said time-period has expired to lock the closure of the control circuit when the cyclic signal has been validated and to open the control circuit when the cyclic signal has not been validated.

7. The device according to claim 6, wherein said receiver is on board the vehicle, said presence detector is integrated into the vehicle, the apparatus is a motor of the vehicle, and said switching system is in a circuit necessary for operation of at least one of an ignition, a starter circuit, and a fuel circuit of the motor.

8. The device according to claim 4, wherein said presence detector comprises a sensor in or on a seat of the vehicle and adapted to be activated when a user sits on the seat.

9. The device according to claim 4, wherein said presence detector comprises a system that detects when a gear has been selected.

10. The device according to claim 4, wherein said presence detector comprises a system that detects a preset engine speed.

11. The device according to claim 4, wherein said presence detector comprises a close/open sensor of a door of the vehicle.

12. The device according to claim 4, wherein said presence detector comprises a safety belt fastening sensor.

13. The device according to claim 4, wherein said presence detector comprises an infrared sensor implanted in the vehicle.

14. The device according to claim 4, further comprising means for detecting a presence or absence of a voltage at an ON/OFF contact of a starter for the apparatus and for transmitting corresponding information to said controller in order to activate said receiver only in case of presence of the voltage.

15. The device according to claim 4, wherein said presence sensor is close to a door of the vehicle and sends information to said controller to activate said receiver.

* * * * *